April 16, 1963 S. M. FOMENKO 3,086,120

ELECTRO-OPTICAL DEVICES

Filed June 5, 1959 2 Sheets-Sheet 1

SERGEI M. FOMENKO
INVENTOR.

BY [signatures]

ATTORNEYS

ELECTRO-OPTICAL DEVICES

Filed June 5, 1959 2 Sheets-Sheet 2

SWITCH 47 CLOSED AT 1
SWITCH 48 CLOSED AT 2

SERGEI M. FOMENKO
INVENTOR.
BY
ATTORNEYS

United States Patent Office 3,086,120
Patented Apr. 16, 1963

3,086,120
ELECTRO-OPTICAL DEVICES

Sergei M. Fomenko, Woodland Hills, Calif., assignor to Thompson Ramo Wooldridge Inc., Los Angeles, Calif., a corporation of Ohio Filed June 5, 1959, Ser. No. 818,388
5 Claims. (Cl. 250—213)

This invention relates to electro-optical devices and more particularly to a new and improved electro-optical device for transmitting light signals and for utilizing the light transmission properties of electro-optical devices to perform logical functions.

In known types of digital computers and data processing systems, information is generally transferred between circuit elements within the computer by means of electrical signals. As the size of digital computers and data processing systems increased, the wiring required for information transfer has become extremely complex. In an effort to reduce the amount of wiring required, it has been proposed to utilize electro-optical techniques in which a light signal is employed to transfer information. Accordingly, devices using light signals have been constructed which are capable of performing various functions required of a digital computer.

When circuit elements which operate in response to light signals are utilized, the light signals must be transmitted from point to point within the computer. For example, transmission of a light signal within a digital computer may be accomplished by placing two circuit elements side by side so that there is a direct transfer of light from one element to another. In this manner the output of one circuit element is applied to the input of the next succeeding circuit element. For transmission of a light signal over larger distances, optical systems including lenses, transmitting rods and mirrors may be employed. However, such optical systems are relatively costly and have the disadvantage of attenuating the light signal during transmission.

Accordingly, it is an object of the present invention to provide an electro-optical device to transmit light signals from one point to another within a digital computer or data processing system.

It is another object of the present invention to provide an electro-optical device for transmission of light signals without attenuation.

It is yet another object of the present invention to provide an electro-optical device for the transmission of light which requires a minimum of electrical wiring.

It is a further object of the present invention to provide an electro-optical device for the transmission of light upon the application of a momentary light signal thereto to a point remotely situated with respect to the point at which the momentary signal is applied.

It is a still further object of the present invention to provide an electro-optical switching device for use in data processing and digital computer systems.

In accordance with one aspect of the present invention, there is provided an electro-optical device which is adapted to receive a Light Input signal at one location and to produce a Light Output signal at another location. A light-sensitive, electron-emissive material is adapted to receive the Light Input signal and an electron-sensitive material is adapted to receive electrons emitted from the electron-emissive material so as to generate a Light Output signal. By establishing an electric field between the two materials, electrons emitted by the light-sensitive material are accelerated into contact with the electron-sensitive material so as to cause the electron-sensitive material to emit light energy.

A particular arrangement in accordance with the invention may include an elongated structure throughout the length of which the light-sensitive electron-emissive material and the electron-sensitive light-emissive material are arranged in spaced relationship. In operation, a Light Input signal applied to one part of the device activates the light-sensitive material to produce electrons which impinge upon the electron-sensitive light-emissive material, which in turn produces light which is applied to the light-sensitive electron-emissive material to produce still more electrons. The above described operation rapidly propagates along the length of the device so that a Light Output signal of equal or greater intensity is provided at a location distant from the location at which the Light Input signal was applied. Accordingly, the present invention is capable of transmitting a light signal from one location to another by an electro-optical mechanism without attenuation and with amplification.

In accordance with another aspect of the invention, an electro-optical switching device is provided in which electrical output signals are generated in response to the application of Light Input signals. In a particular arrangement, the Light Input signals may be applied to two separate sections of the device, each of which sections includes a light-sensitive electron-emissive material spaced apart from an electron-sensitive light-emissive material. In operation, the two sections are alternately placed in a condition in which current passes between the two materials by virtue of electrons emitted from the electron-emissive material. Electrical circuitry connected to the two sections of the electro-optical devices provides an electrical output signal having a value determined by current flow through each section of the electro-optical device.

A better understanding of the invention may be had from a reading of the following detailed description and an inspection of the drawings, in which.

Figure 1:
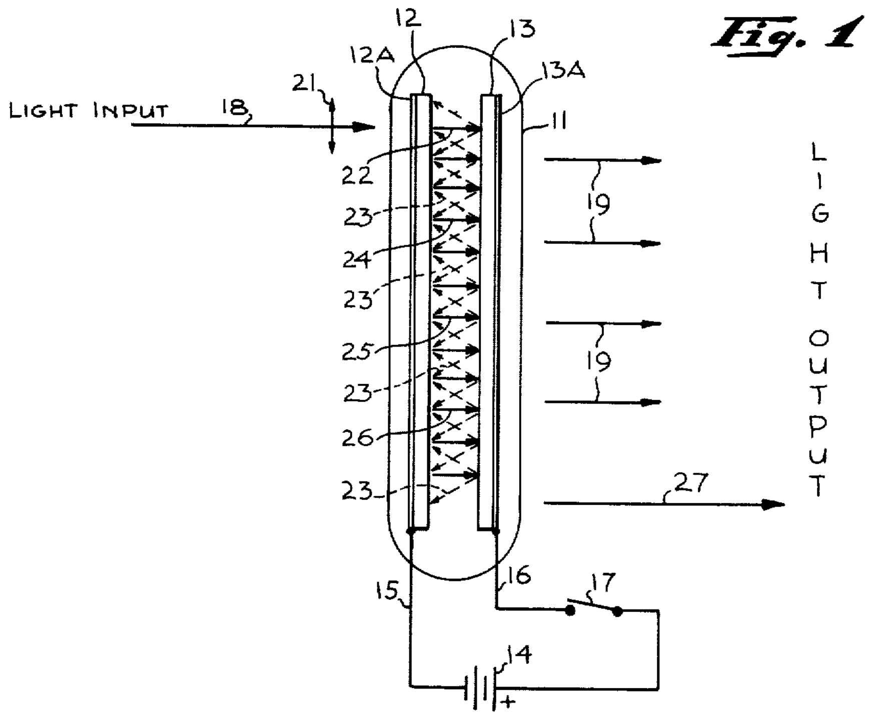
FIG. 1 is a schematic representation of an electro-optical light transmission device in accordance with the present invention.

Referring now to the drawing, and more particularly to FIG. 1, there is illustrated an electro-optical light transmission device in accordance with the present invention which includes an elongated evacuated envelope 11. Disposed within the evacuated envelope is a layer of light-sensitive electron-emissive material 12 adapted to emit electrons upon the application of a light signal thereto. Hereafter the layer 12 will be referred to as the photo-emissive layer 12. Examples of materials from which the photo-emissive layer 12 may be constructed are silver-cesium, oxide-cesium, or antimony-cesium. Photo-emissive layers of material are sometimes referred to as photo-cathodes.

A layer of electron-sensitive light-emissive material 13 is also disposed within the elongated evacuated envelope 11 for emitting light in response to electrons impinging thereon. The layer 13 may be constructed of a cathodoluminescent material, as for example, manganese activated zinc silicate or silver activated zinc sulphide. The photo-emissive layer 12 of FIG. 1 may be constructed in a vacuum chamber in which a suitable base plate is placed within the chamber along with material which is to be deposited on the base plate. A silver layer is then evaporated onto the base plate, followed by a cesium oxide layer, and then a cesium layer, in that order. Base plates constructed of any material which permits the passage of light may be used. Examples of such materials are clear plastic and glass.

The cathodo-luminescent layer 13 of FIG. 1 may be similarly constructed by evaporating in a vacuum chamber a zinc silicate layer upon a suitable base plate of the type above described and thereafter evaporating a layer of manganese over the zinc silicate. Although zinc silicate alone will not emit light in response to the application of electrons thereto, when the layer of manganese is added to the layer of zinc silicate, the manganese activates the zinc silicate in such a manner that upon electrons striking it, the activated phosphor-anode emits light.

By establishing an electric field between the photo-cathode 12 and the phosphor-anode 13, the electrons emitted by the photo-emissive layer 12 are accelerated into contact with the cathodo-luminescent layer 13 This electric field is established by introducing two transparent electrodes 12A and 13A (conductors) attached to the photo-emissive layer 12 and the cathode-luminescent layer 13 which may comprise, for example, a thin layer of silver. Since it is difficult to obtain a material which is transparent to electrons, a material which is transparent to light is used and the electrodes 12A and 13A made of such a material are attached to the left side of the layer 12 and the right side of the layer 13 so that the passage of electrons from layer 12 to layer 13 will not be interfered with.

As shown in FIG. 1, a lead 15 is connected to the electrode 12A attached to the photo-emissive layer 12, and a lead 16 is connected to the electrode 13A attached to the cathodo-luminescent layer 13. Connected between leads 15 and 16 is a source of potential such as a battery 14. A switch 17 is connected between lead 16 and the positive terminal of the battery 14 so that when the switch 17 is in its closed position, an electric field is established between the layer 12 and the layer 13. Thus, electrons emitted by the photo-emissive layer 12 are accelerated into contact with the cathodo-luminescent layer 13.

Although means for interrupting the application of the potential between electrode 12A and electrode 13A is illustrated as a single-pole, single-throw switch 17 in FIG. 1, it will be understood that the switch 17 and the battery 14 may be replaced by a circuit for applying a potential between the electrodes 12A and 13A at predetermined times for predetermined periods in accordance with signal information. For example, a clock pulse or other signal may be applied to the leads 15 and 16 so that the cathodo-luminescent layer 13 will emit light only during a predetermined period of time when it is desired to transfer information within a digital computer when the layer 12 is illuminated by light.

A Light Input signal as represented by the arrow 18 is applied to the device of FIG. 1 to produce Light Output signals. The Light Output signals from the device of FIG. 1 are represented by the arrows 19 and 27.

In operation, a Light Input signal 18 is applied to a selected location of the photo-emissive layer 12. As illustrated by the arrow 21, the Light Input signal 18 may be applied at any desired point along the surface of photo-emissive layer 12. In response to the application of a Light Input signal 18 to the photo-emissive layer 12, the photo-emissive layer 12 will begin to emit electrons. These electrons are emitted in the region in which the Light Input signal was applied. The emitted electrons are accelerated by the applied field from the photo-emissive layer 12 into contact with the cathodo-luminescent layer 13. The electrons initially traveling from the photo-emissive layer 12 to the cathode-luminescent layer 13 in response to the Light Input signal are illustrated by the arrow 22, pointing from left to right in FIG. 1. In response to the electrons, the cathode-luminescent layer 13 emits light in all directions. Part of the emitted light radiates toward the photo-emissive layer 12 as shown by dashed arrows 23, pointing from right to left in FIG. 1. The emitted light striking the photo-emissive layer 12 causes it to emit additional electrons which in turn strike the cathode-luminescent layer 13 as illustrated by arrow 24, pointing from left to right. These emitted electrons in turn cause the phosphor-anode to emit more light, a portion of which is radiated back toward the cathode 12. The above described process continues as shown by arrows 25 and 26 until the cathodo-luminescent layer 13 emits light along its entire length. Thus, the emission of light is propagated along the length of the device with the signals being represented by the arrows 19 and 27.

The cathodo-luminescent layer 13 continues to emit light as a result of the process above described as long as a field is provided which causes the electrons emitted by the photo-emissive layer 12 to strike the cathodo-luminescent layer 13.

Thus, a momentary application of a Light Input signal 18 at any point along the entire length of the photo-emissive layer 12 causes the cathodo-luminescent layer 13 to emit light along its entire length.

The light emitted by the cathodo-luminescent layer 13 may be applied to utilization apparatus at any desired location. For example, the entire section of the elongated evacuated envelope 11 adjacent the layer 13 may be left clear to permit the light emitted by the layer 13 to strike elements located adjacent the envelope 11. In the alternative, the section of the envelope 11 adjacent the layer 13 may be darkened as by applying an opaque paint or the like along the entire surface with the exception of those points from which it is desired to have a Light Output. An electro-optical circuit element or an additional light transmission element of the type illustrated in FIG. 1 may be placed at these points to perform desired operations within the computer.

Figure 2:
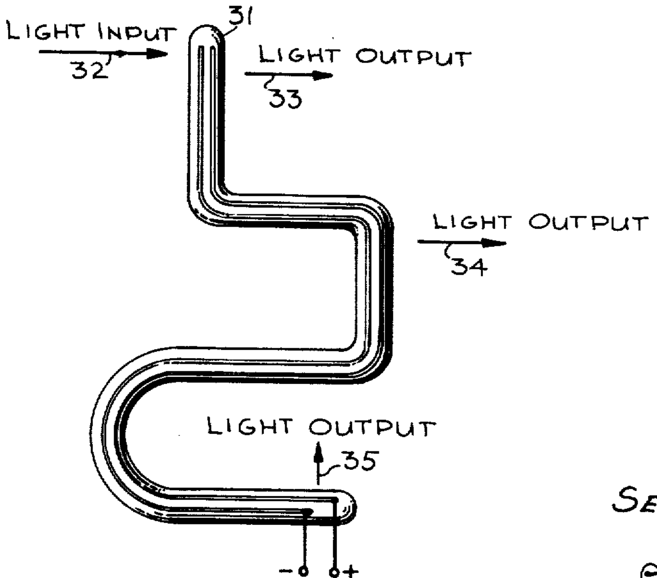
FIG. 2 illustrates an electro-optical device similar to that of FIG. 1 for providing Light Output signals at locations distant from the location of a Light Input signal.

It is therefore seen that by applying a Light Input signal at the uppermost portion of the photo-emissive layer 12, as shown by the Light Input signal arrow 18, a Light Output signal may be taken from the lowermost portion of the layer 13 as shown by the arrow 27. Although an electro-optical transmission device in accordance with the present invention is illustrated in FIG. 1 as housed in an elongated, straight envelope, the envelope and the components contained therein may take any desired configuration. One configuration which the electro-optical light transmission device may assume is illustrated in FIG. 2. As is shown, the envelope and the components therein which are illustrated at 31 may take any desired configuration. The application of a Light Input signal 32 causes a Light Output signal to develop along the entire length of the envelope 31. As above described, the Light Output signal may be taken from any desired point along the length of the electro-optical transmission device. Such points are illustrated by arrows 33, 34 and 35, each of which is labeled Light Output. Various electro-optical components adapted to perform the desired function at each location may be placed to receive the Light Output signals from the device 31.

Figure 3:
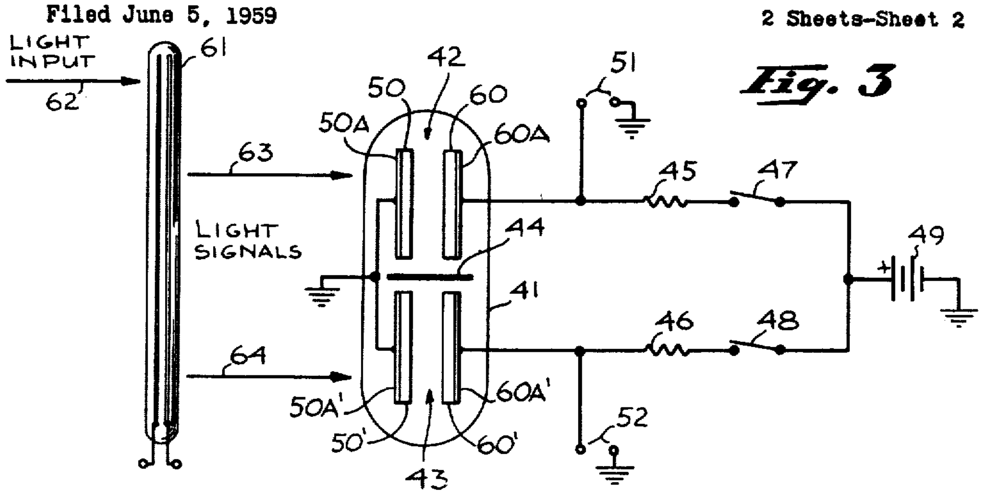
FIG. 3 is a schematic circuit diagram illustrating a switching circuit in accordance with the present invention.

Referring now to FIG. 3, a circuit is schematically illustrated which utilizes the electro-optical transmission device of the present invention. The circuit of FIG. 3 is a bistable storage device, i.e. flip-flop. The circuit comprises two sections 42 and 43 which are housed in an evacuated envelope 41. Each of the sections 42 and 43 is constructed and operates similarly to the apparatus described above in conjunction with FIG. 1. Section 42 contains a photo-emissive layer 50 to which is attached a transparent electrode 50A and a cathodo-luminescent layer 60 to which is attached a transparent electrode 60A, while section 43 contains a photo-emissive layer 50′ to which is attached a transparent electrode 50A′ and a cathodo-luminescent layer 60′ to which is attached a transparent electrode 60A′. Layers 50 and 50′ emit electrons upon application of light thereto, while layers 60 and 60′ emit light when electrons impinge thereon. Light emitted by the layers 60 and 60′ strikes each of their respective layers 50 and 50', causing more electrons to be emitted, which in turn causes additional light to be emitted. This process continues until the particular section 42 or 43 becomes saturated, that is, additional light striking the photo-emissive layer does not cause additional electrons to be emitted. An opaque light shield 44 is interposed between the sections 42 and 43. The light shield 44 prevents light which is emitted by layer 60 from striking layer 50' and light emitted by layer 60' from striking layer 50.

The electrodes 50A and 50A' are interconnected and returned to a point of fixed potential such as ground. Electrode 60A has a resistor 45 connected thereto and a switch 47 is connected between the resistor 45 and the positive terminal of a source of potential such as a battery 49. The negative terminal of the battery 49 is connected to a point of fixed potential such as ground. Electrode 60A' has a resistor 46 connected thereto and a switch 48 is connected between the resistor 46 and the positive terminal of a battery 49. A first pair of signal output terminals 51 are connected between the layer 60 and the resistor 45, while a second pair of signal output terminals 52 are connected between the layer 60' and the resistor 46.

An electro-optical transmission device such as that illustrated in FIG. 1 is shown at 61 in FIG. 3. A Light Input signal 62 is applied to the upper portion of the electro-optical transmission device 61 so that light signals are applied to layers 50 and 50' of the bistable device as indicated at 63 and 64.

Figure 4:
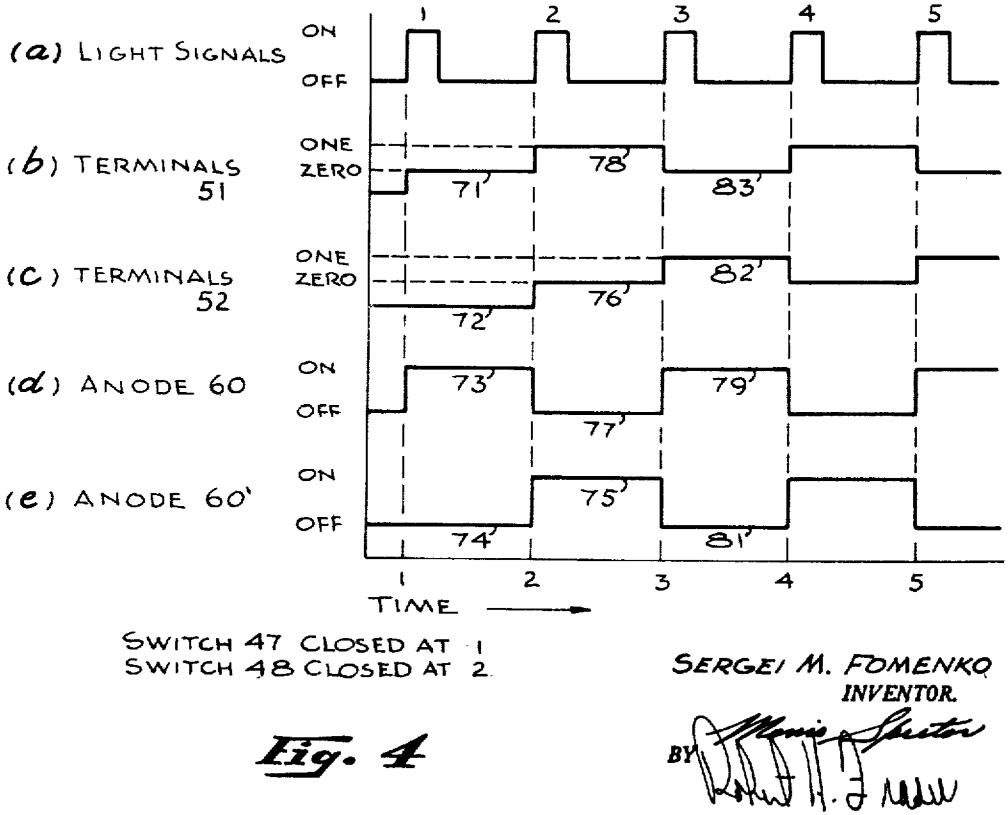
FIG. 4 is a graphical illustration of certain electrical and optical signals occurring in the arrangement of FIG. 3.

The operation of the circuit of FIG. 3 may be considered in conjunction with the graphical illustrations of FIG. 4. The abscissa of FIG. 4 represents time, while the ordinate represents the On or Off states at the various points of the circuit as indicated thereon. For purposes of discussion, it will be assumed that the switch 47 closes simultaneously upon the application of the first Light Input signal and thereafter remains closed, and that switch 48 closes upon the application of the second Light Input signal and thereafter remains closed.

With the foregoing assumptions, the following operation occurs. Prior to the application of light signals to either the layer 50 or 50', which is also prior to the closing of switches 47 or 48, the signals appearing at output terminals 51 and 52 are in their no voltage state. Upon the application of the first light signal from the electro-optical transmission device 61 to the layers 50 and 50', and upon the simultaneous closing of switch 47, layer 60 emits light and becomes saturated. Since electrons emitted by layer 50 are collected by layer 60, current flows through the resistor 45 which produces an electrical signal at the output terminals 51. The magnitude of this signal will be the voltage of battery 49 less the voltage drop appearing across resistor 45 and is illustrated in FIG. 4(*b*) at 71. Since switch 48 remains open during this period of time, no voltage appears at output terminals 52, as shown at 72 of FIG. 4(*c*).

Since light has been applied to the layer 50 and a potential is also applied between electrodes 50A and 60A, layer 60 emits light as illustrated at 73 in FIG. 4(*d*), while layer 60' remains in its Off condition as shown in FIG. 4(*e*) at 74. Each of the layers 60 and 60' is in either one of two states; either On, which indicates that it is emitting light, or Off, which indicates that it is not emitting light.

Upon the application of the next succeeding Light Input signal, as shown at 2 in FIG. 4(*a*), switch 48 may be closed. With switch 48 closed and a pulse of light applied to layer 50', layer 60' emits light and becomes saturated as illustrated in FIG. 4(*e*). Current flows through the resistor 46 so that an electrical signal appears at the output terminals 52 as shown in FIG. 4(*c*) at 76 of the value of the voltage of the battery 49 less the voltage drop appearing across resistor 46.

At this time, upon the application of light signal 2, layer 60 ceases to emit light or goes to its Off position as is shown at 77. This occurs since the section 42 is in its saturated condition as a result of the application of Light Input signal 1 and the closing of switch 47. Upon the application of a Light Input signal pulse 2, an increased current flows between layers 50 and 60 with the result that the voltage between the layers drops due to the increased voltage drop across the resistor 45. The reduced field is insufficient to cause the electrons emitted by the layer 50 to impinge upon the layer 60 with sufficient velocity to produce light emission. The feedback ceases, and the electro-optical element 42 ceases operation so that the signal appearing at output terminals 51 rises to the value of the voltage of battery 49. Therefore, the signal appearing at output terminals 51 rises as shown in FIG. 4(*b*) at 78.

In this state, the circuit of FIG. 3 is ready for the transfer of information and the storage thereof in accordance with well known logical techniques. In this state, the signal appearing at terminals 51 may be considered to be in the binary One state, while the signal appearing at terminal 52 may be considered to be in the binary Zero state. Upon the application of the next succeeding light pulse, as indicated in FIG. 4(*a*) at 3, layer 60 emits light as illustrated in FIG. 4(*e*) at 79, while layer 60' ceases to emit light as illustrated in FIG. 4(*e*) at 81. This causes the signals appearing at terminals 52 and terminals 51 to reverse their states so that the signal at 52 is now in its high or One state as shown in FIG. 4(*c*) at 82, and the signal at terminal 51 is in its low or Zero state as shown in FIG. 4(*b*) at 83. Upon the successive applications of Light Input pulses as illustrated in FIG. 4(*a*) at 4 and 5, the states appearing at terminals 51 and 52 and the conditions of layers 60 and 60' will reverse from their immediately preceding states as illustrated by the waveforms of FIG. 4.

It is therefore seen that the signals appearing at terminals 51 and 52 are complementary and that the Light Output of layers 60 and 60' are also complementary. Thus, either electrical signals or light signals, or both, may be taken from the circuit as illustrated in FIG. 3. Since the signals appearing at either of the terminals 51 or 52 or the layers 60 and 60' remain in a steady state position during the time that no Light Input signal is applied, the information stored by the circuit may be applied to other utilization apparatus during this period. Thus, the circuit as illustrated in FIG. 3 functions as a bistable storage device which produces either Light Output signals or electrical output signals.

There has been thus disclosed an electro-optical transmission device for transferring light signals from one point to another upon the momentary application of a light signal thereto, along with a circuit for storing information which utilizes the transmission device of the invention. However, it will be appreciated that the principles of the invention are not limited to the particular arrangements shown and described herein which are intended to be by way of example only. Accordingly, any and all variations, modifications, or equivalent arrangements falling within the scope of the annexed claims should be considered to be a part of the invention.

What is claimed is:

1. An electro-optical device for use as a memory element in a logic circuit responsive to Light Input signals comprising a single evacuated envelope, a pair of individual sections within said envelope, each of said sections comprising a photo-emissive layer, a cathodo-luminescent layer arranged substantially opposite the photo-emissive layer over the extent thereof, means for extending the emission of electrons and radiation of light over the extent of one of said sections in response to light incident upon only a portion thereof including positioning the layers with respect to each other so that radiated light and emitted electrons may diffuse throughout the space between the layers of a section, a source of light signals, a source of potential for maintaining a predetermined potential difference between the layers of an individual section, and an impervious light shield positioned between the two sections in order to prevent light and electrons from one section from affecting the operation of the other section within the envelope.

2. A logic circuit responsive to Light Input signals comprising in combination a first electro-optical device including an elongated evacuated envelope, a photo-emissive layer positioned within the envelope along one side thereof, a cathodo-luminescent layer also positioned within the envelope and arranged opposite the photo-emissive layer over the entire extent thereof, means for applying a potential difference between the two layers sufficient to accelerate electrons emitted by the photo-emissive layer into contact with the cathodo-luminescent layer, and means for producing light in a direction and position outside the optical range of a Light Input signal incident upon said device including positioning the two layers so that electrons and light diffuse along the entire extent of the two layers; and a second electro-optical device positioned to receive output light signals from the first device and including in a single evacuated envelope a pair of individual sections, each having a photo-emissive layer, a cathodo-luminescent layer opposite the photo-emissive layer, means for diffusing the emission of electrons and radiation of light over the entire section, means for applying voltages to the respective layers of the individual sections, output terminals connected individually to one layer of each section, and an impervious shield positioned between the two sections in order to prevent light and electrons from one section from affecting the operation of the other section within the envelope.

3. A system for representing and transferring binary-coded information comprising: a switching device capable of assuming either one of two distinct stable states, said device including an evacuated envelope, first means disposed within said envelope for emitting electrons in response to the application of a light pulse thereto, second means disposed within said envelope adjacent said first means for emitting light in response to electrons impinging thereon, means for applying a field between said first and second means to accelerate electrons emitted by said first means into contact with said second means; said first and second means being positioned to provide regenerative feedback such that when electrons are emitted by said first means, light responsive to said electrons is emitted by said second means to cause additional electrons to be emitted by said first means to thereby define a first of said stable states, the second of said stable states being characterized by the absence of electron and light emission from said first and second means respectively; and light pulse producing means for switching said device from said first to said second stable state and from said second to said first stable state.

4. The system of claim 3 including means for selectively applying a light pulse from said pulse producing means to a point on said first means to cause said device to switch states.

5. The system of claim 4 wherein said evacuated envelope is elongated and curved and said first and second means are substantially coextensive therewith to thereby permit representations of binary-coded information to be physically transferred to arbitrary destinations outside the optical range of the point of application of said light pulse to said first means.

References Cited in the file of this patent

UNITED STATES PATENTS

| | | |
|---|---|---|
| 2,173,164 | Hansell | Sept. 19, 1939 |
| 2,605,335 | Greenwood et al. | July 29, 1952 |
| 2,805,360 | McNaney | Sept. 3, 1957 |
| 2,896,088 | Lempert | July 21, 1959 |
| 2,947,874 | Tomlinson | Aug. 2, 1960 |

UNITED STATES PATENT OFFICE
CERTIFICATE OF CORRECTION

Patent No. 3,086,120

April 16, 1963

Sergei M. Fomenko

It is hereby certified that error appears in the above numbered patent requiring correction and that the said Letters Patent should read as corrected below.

Column 1, line 64, after "electron-sensitive" insert -- light-emissive --; column 3, lines 19, 69 and 72, and column 4, line 3, for "cathode-luminescent", each occurrence, read -- cathodo-luminescent --; column 5, line 75, before "time" insert -- same --.

Signed and sealed this 31st day of March 1964.

SEAL)
test:
NEST W. SWIDER testing Officer

EDWARD J. BRENNER

Commissioner of Patents